United States Patent [19]

Recker

[11] Patent Number: 4,523,871
[45] Date of Patent: Jun. 18, 1985

[54] AUTOMATIC LOCK OPEN U-JOINT COUPLER

[76] Inventor: Florian B. Recker, 802 First St. SW., Dyersville, Iowa 52040

[21] Appl. No.: 829,910

[22] Filed: Sep. 1, 1977

[51] Int. Cl.³ .............................................. F16B 7/00
[52] U.S. Cl. .................................... 403/12; 403/322; 403/359
[58] Field of Search .............. 403/359, 322, 325, 316, 403/12, 13; 285/313, 277

[56] References Cited

U.S. PATENT DOCUMENTS

| 1,848,538 | 3/1932 | Mudd | 285/375 X |
| 2,673,750 | 3/1954 | Scheiwer | 285/277 |
| 3,357,206 | 12/1967 | Christie | 403/325 X |
| 3,721,462 | 3/1973 | Pawlitzki | 403/322 |
| 3,747,966 | 7/1973 | Wilkes | 403/322 X |
| 3,969,033 | 7/1976 | Recker | 403/322 |
| 4,125,337 | 11/1978 | Recker | 403/11 |

*Primary Examiner*—Andrew V. Kundrat
*Attorney, Agent, or Firm*—Henderson & Sturm

[57] ABSTRACT

A torque transmitting coupling of a type having a mechanism for automatically locking a shaft to a housing upon insertion of the shaft into an opening in the housing and including structure for allowing unlocking of the shaft from the housing or the housing onto the shaft.

5 Claims, 12 Drawing Figures

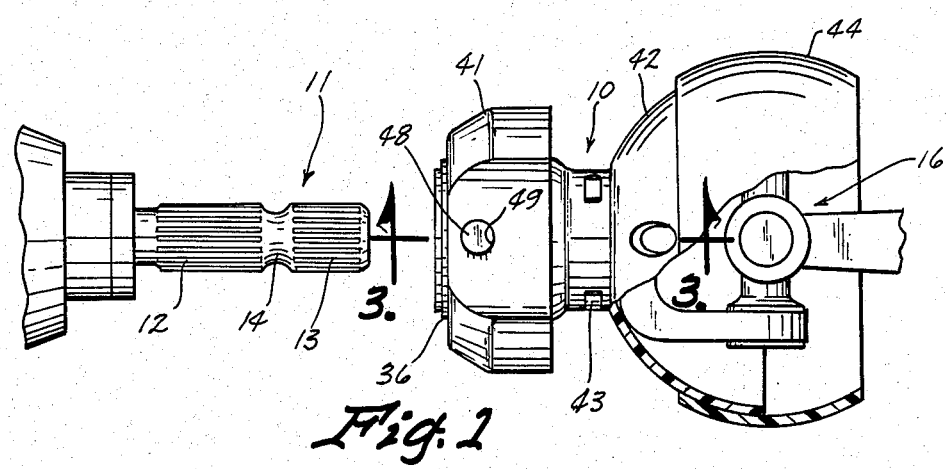
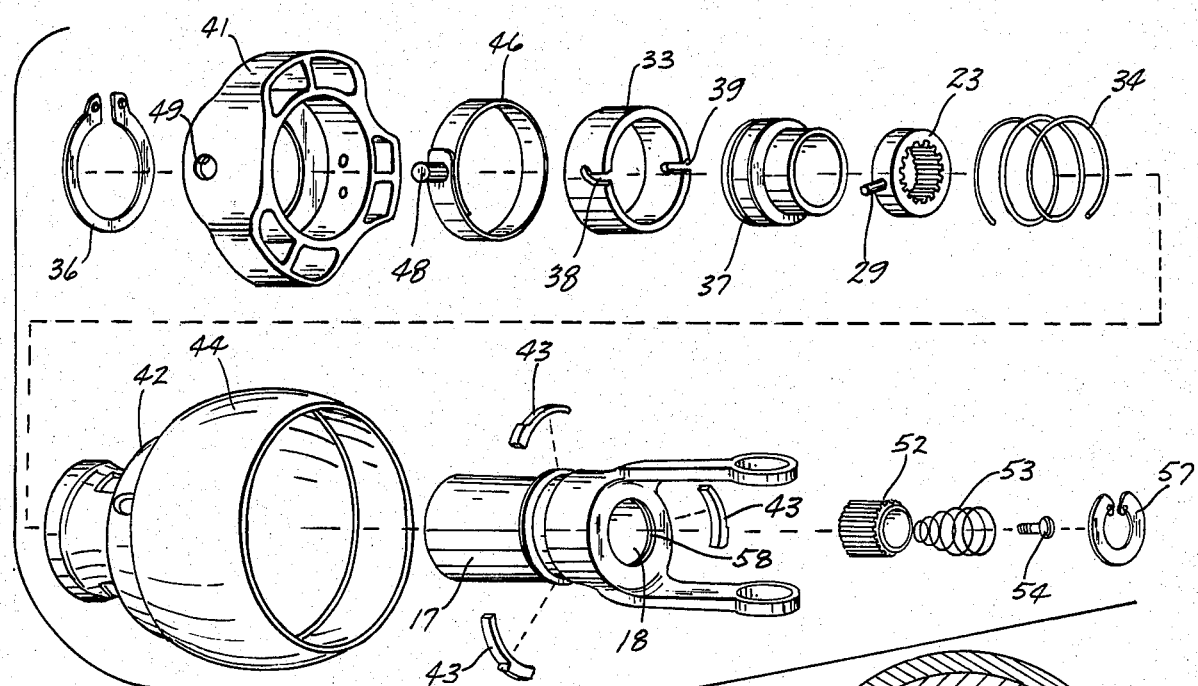
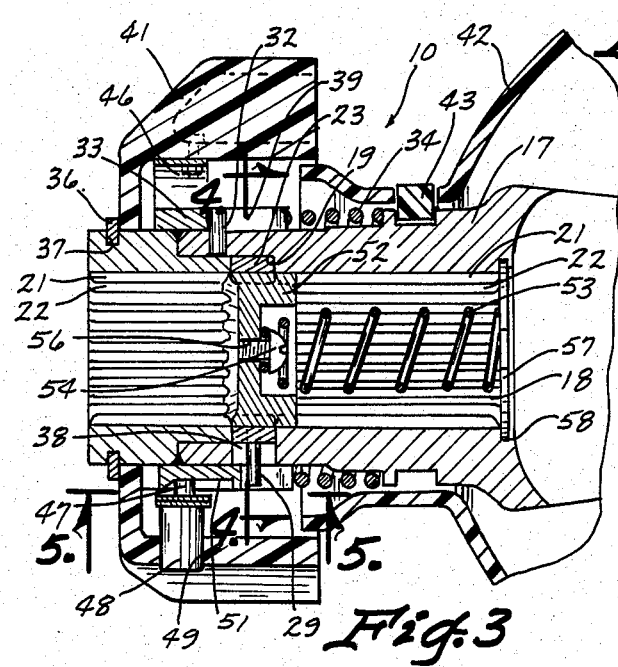
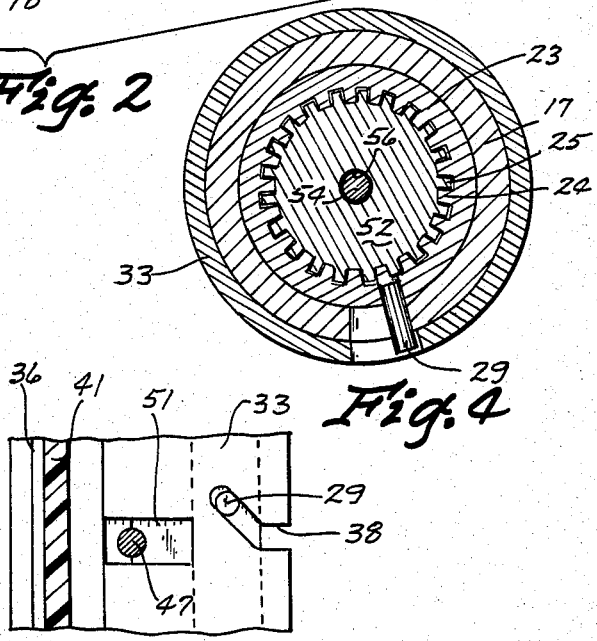
Fig. 2
Fig. 3
Fig. 4
Fig. 5

AUTOMATIC LOCK OPEN U-JOINT COUPLER

BACKGROUND OF THE INVENTION

The present invention relates generally to shaft couplings and more particularly to a shaft coupling for transmitting a torque force from one shaft to another.

The problem of how to couple one shaft to another for transmitting a torque force is a longstanding one. This has particularly been a problem in the farming community wherein the power take-off of an agricultural tractor frequently needs to be connected and disconnected to utilize one implement and then another. This problem has been solved in the past in one degree or another, and one of the most commercially successful of these solutions is a connection of the type disclosed in U.S. Patent No. 2,448,278 to Ronning which was patented in 1948.

In U.S. Pat. No. 2,448,278, a pin is biased to one position within a housing so that it will contact one spline of a power take-off to thereby hold the coupling together. In another position of the pin, it is moved so that it does not block or contact any of the splines and thereby allows the housing to be removed from the power take-off shaft.

Another type of coupling device particularly for use with agricultural equipment is shown in U.S. Pat. Nos. 3,969,033, 3,992,119 and 3,992,120 issued to Recker. These patents disclose a design for locking on all of the splines of a power take-off shaft by use of a rotatable splines and grooved sleeve disposed within a coupler housing. The locking mechanism is biased to a locked position.

Still another example of a type of coupling structure for selectively coupling splined shafts together is shown in in U.S. Pat. No. 3,260,541 to Sadler et al, which patent discloses a plurality of balls in a housing which are selectively movable into and out of locking engagement with a power take-off shaft. The balls are biased to locked position.

In all of the above mentioned patents, the devices disclosed require that before the power take-off shaft is inserted into the coupler that the locking mechanism be manually moved to an unlocked position. Then once the shaft is properly positioned within the coupler, the locking mechanism will automatically move to a locked position. To uncouple the shaft, the locking mechanism is manually moved to an unlocked position and the coupler is slid off of the shaft.

It would be very desirable to be able to have such coupling devices of the type referred to above, for example, automatically moved to and held in an unlocked position when the power take-off shaft is removed so that such coupler mechanism could receive the shaft again when re-coupling is desired without the need to manually move the locking mechanism, while still including the feature that the locking mechanism will automatically move to the shaft locking position once the shaft is again received in the coupler to the proper position thereof with respect to the coupler mechanism.

SUMMARY OF THE INVENTION

The invention relates to a torque transmitting coupling of a type having a housing with an opening therein. The opening has a non-circular portion adapted to receive a complementarily shaped shaft. A mechanism is provided for selectively locking the non-circular portion of the shaft to the housing and is biased to a shaft locking position. A further mechanism is operable in response to the removal of the shaft from the opening for holding the locking mechanism in an unlocked position whereby the shaft can be reinserted into the opening and automatically locked in place without the need to manually unlock the locking mechanism in order to get the shaft and housing in a proper position with respect to each other for being locked together.

An object of the present invention is to provide an improved coupling device for transmitting a torque force from one shaft to another.

Another object of the invention is to provide a coupling device which automatically locks by merely inserting a shaft into the coupling device.

A further object of the invention is to provide a torque transmitting coupling which can be produced by slight modification of existing commercial structures.

Still another object of the invention is to provide a coupling which is both dependable to use and economical to produce.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view of one embodiment of the invention shown in readiness to be received on a power take-off shaft of a tractor;

FIG. 2 is an exploded perspective view of the FIG. 1 embodiment;

FIG. 3 is a cross-sectional view taken along line 3—3 of FIG. 1 showing the present invention being held in an open or unlocked position;

FIG. 4 is a cross-sectional view taken along line 3—3 of FIG. 3;

FIG. 5 is a partial cross-sectional view taken along line 5—5 of FIG. 3;

DESCRIPTION OF THE PREFERRED EMBODIMENTS

Figure 6:
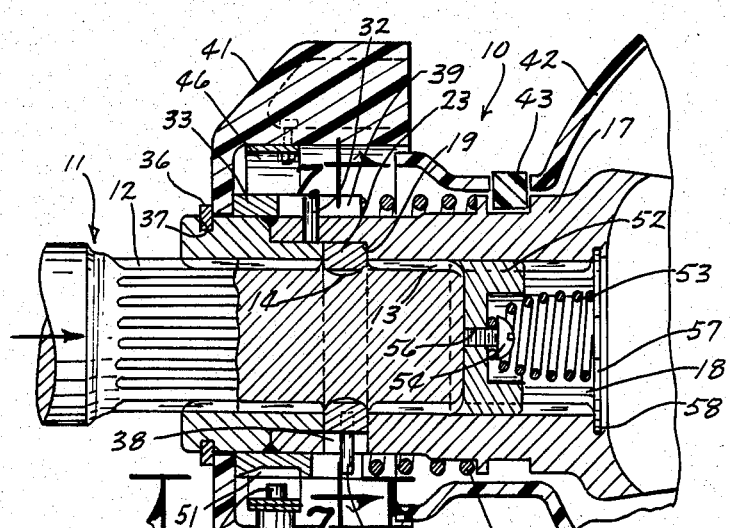
FIG. 6 is a view like FIG. 3 but showing the power take-off shaft locked into the coupler.

Referring now to the drawings wherein like reference numerals designate identical or corresponding parts throughout the several views, FIG. 1 shows a torque transmitting coupling 10 of the present invention in readiness to be connected to the power take-off shaft 11 of an agricultural tractor (not shown). The power take-off shaft 11 has a series of splines 12 and 13 disposed around the periphery thereof and separated by a depression or groove 14. A universal joint structure 16 is clearly shown in FIG. 1 and a portion of this universal joint structure forms a part of the housing 17 of the present invention. The housing 17 has an opening 18 therein. This opening 18 has a portion 19 thereof which is circular and a portion thereof which has splines 21 and grooves 22 about the periphery thereof.

A sleeve 23 is disposed within the circular portion 19 of the opening 18 in the housing 17. This sleeve 23 has a plurality of splines 24 and grooves 25 around the inner periphery thereof. These splines and grooves 24 and 25 of the sleeve 23 are substantially of the same spacing and configuration as the splines and grooves 21 and 22 in the opening 18 in the housing 17.

A pin 29 is threadedly received within the sleeve 23, and this pin 29 extends through a radial slot 31 in the housing 17. Pins 32 are threadedly received into the housing 17 as can clearly be seen in FIGS. 3, 6 and 9.

Figure 8:
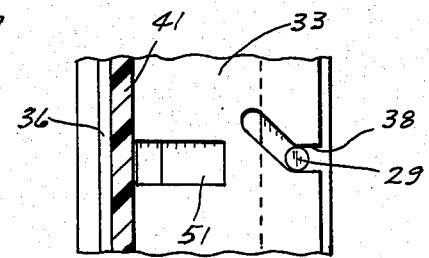
FIG. 8 is a view taken along line 8—8 of FIG. 6.

A collar 33 is slideably received on the housing 17 and this collar 33 is biased by a spring 34 to the position shown in FIG. 8. A snap ring 36 received in a slot 37 in the housing 17 prevents the collar 33 from moving any further to the left than the position as shown in FIG. 6.

Referring to FIGS. 2 and 3, for example, it is noted that the collar 33 has a camming slot 38 in one side thereof and a straight slot 39 in the other side thereof. The pin 29, attached to the sleeve 23, extends upwardly into the camming slot 38 while a second pin 32, rigidly attached to the housing 17, extends upwardly into the straight slot 39. A free spinning guard 41 is also rotatably attached about the housing 17 and is held in place between the snap ring 36 and the collar 33. Another guard 42 is attached to the housing 17 by means of fastener members 43, which is not a part of this invention and which is well known in this art. A second part 44 is slideably attached to the guard 42 as can be seen in detail in FIGS. 1 and 2.

Disposed within the guard 41 and around the collar 33 in housing 17 is a leaf spring 46 which is formed into an annulus and the ends thereof are connected together by a bolt 47 which extends through the ends of the spring 46 and is threadedly engaged into a button 48. This button 48 extends through an opening 49 in the guard 41 for reasons which will be explained below. A slot or a plurality of identical slots 51 are formed about the periphery of the collar 33 as can be clearly seen in FIGS. 3 and 6, for example.

Referring still to the first embodiment shown in FIGS. 1-9, a stub shaft member 52 is shown within the opening 18 in the housing 17. This stub shaft 52 has splines and grooves formed about the periphery thereof which are generally the same shape as the splines 12 and 13 of the power take-off shaft 11 and, of course, are complementary to the spline and groove configuration 21 and 22 of the opening 18. This stub shaft member 52 has a spring 53 of a compression type attached to the center thereof by a bolt member 54 which is threadedly received within an opening 56 in the center of the stub shaft member 52 for rigidly holding one end of the spring 53 to the stub shaft member 52. The other end of the compression spring 52 abuts a clip or washer-like member 57 which is received in a groove 58 in the housing 17. Consequently, the spring 53 biases the stub shaft member 52 to the position shown in FIG. 3. The stub shaft member 52 is also prevented from traveling further to the left than as shown in FIG. 3 because the spring member 53 is furthermore preferably connected to the clip member 57.

The operation of the preferred embodiment of FIGS. 1-9 will now be explained. Normally the U-joint structure 16 would be connected to an implement (not shown) and once it is desired to connect such implement to an agricultural tractor (not shown), the tractor would be backed up to such implement so that the power take-off off shaft 11 of the tractor is in close proximity to the coupling 10, for example, as shown in FIG. 1. The tractor operator first makes sure that the power take-off shaft 11 is not rotating because, of course, he has a control for turning the power on and off to the power take-off shaft 11. The tractor operator would then dismount his tractor and grasp the coupling 10 by grabbing hold of the free spinning guard 41. Coupling 10 would then manually be pulled toward the power take-off shaft 11 so that the power take-off shaft 11 can be received within the opening 18 of the housing 17. Sometimes it is difficult to get the splines and grooves of the power take-off shaft 11 lined up with the splines and grooves in the housing 18; and, because the power take-off shaft 11 is sometimes locked and cannot be turned, it is necessary to be able to turn the housing 17. It is for that reason that the button 48 and its associated structure is provided. If the splines and grooves do not line up, then the button 48 can be pushed in (FIG. 6) overcoming the bias of the spring 46 and causing the head of the bolt 47 to be received in the groove 51 in the sleeve 33.

While it is true that the collar 33 can move in a reciprocating fashion with respect to the housing 17, it cannot rotate with respect to the housing 17 because of the pin 32 received in the straight slot 39. Consequently, rotation of the collar 33 effects rotation of the housing 17 and thereby effects the orientation of the splines and grooves 21 and 22 of the opening 18 with respect to the power take-off shaft 11. Therefore, the splines and grooves of the opening 18 can be oriented such that they are complementarily aligned with the splines and grooves of the power take-off shaft 11 so the power take-off shaft 11 can be freely received within the opening 18.

Figure 7:
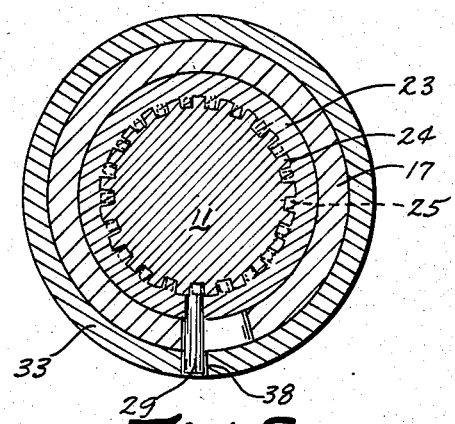
FIG. 7 is a cross-sectional view taken along line 7—7 of FIG. 6.

During this operation, the member 52 would be in the position shown in FIGS. 3 and 4 such that the sleeve 23 is held in a locked-open position, i.e., the splines and grooves of the sleeve 23 are aligned with the splines and grooves 21 and 22 of the opening 18. As the power take-off shaft 11 is received into the opening 18 from the left side of the coupler 10 as viewed in FIG. 3, the end of the power take-off shaft 11 will nest into and be in contact with the member 52 so as to push it to the right to the position as shown in FIGS. 6 and 7. Once the shaft 11 is received in the opening 18 such that the groove 14 is aligned with the sleeve 23, the sleeve 23 will automatically rotate to the locked position as will be understood more clearly by reference to the above mentioned U.S. Pat. No. 3,969,033 to Recker, which is incorporated herein by reference. This rotation of locking sleeve 23 is caused by the spring 34 which is biasing the collar 33 to the left which in turn causes the camming slot 38 to move the pin 29 which ultimately causes rotation of the locking sleeve 23. Once this is done, the coupling is complete and rotation of the power take-off shaft 11 of the tractor transmits rotary power through the coupling 10 and back to the implement connected to the universal joint 16.

Figure 9:
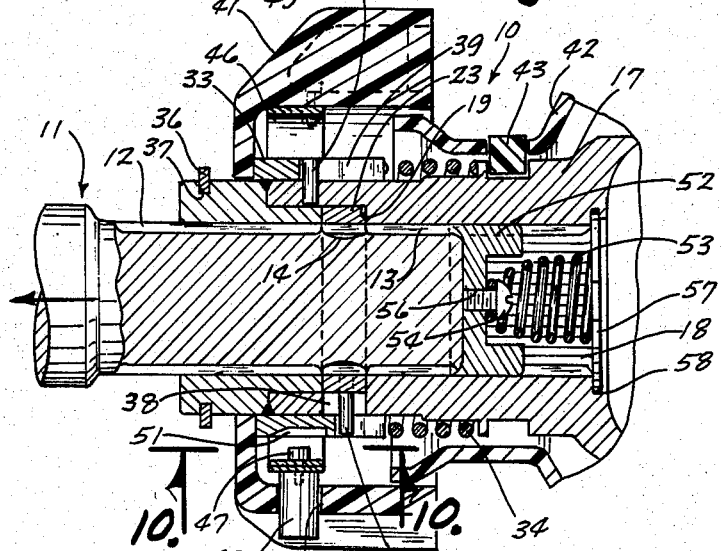
FIG. 9 is a cross-sectional view like FIG. 6 but showing the coupler in an unlocked or open position.

When it is desired to uncouple the coupler 10 from the power take-off shaft 11, such as when the implement in use is no longer desired to be used, the tractor operator would turn off the power to the power take-off shaft 11, dismount his tractor and manually pull the free spinning collar 41 from the position shown in FIG. 6 to the position shown in FIG. 9, by overcoming the force of the compression spring 34. Once this has been done, the pin 29 is moved in like fashion from the locked position shown in FIG. 8 to the unlocked position shown in FIG. 10; and, because the pin 29 is affixed to the sleeve 23, this causes rotation of the sleeve 23 to move to the unlocked position wherein the splines and grooves of the sleeve 23 are again in alignment with the splines and grooves 21 and 22 of the opening 18 of the housing 17, for example, in the position shown in FIGS. 3, 4 and 9. Consequently, further manual force on the free spinning guard 31 to the right as viewed in FIG. 9 causes the coupler 10 to be pulled off of the power take-off shaft 11. When this is done, the member 52 follows the power take-off shaft 11 from the position shown in FIGS. 6 and 9 to the position shown in FIG. 3. As the power take-off shaft is moving out to the left as viewed in these drawings and just before the member 52 is moved to the position shown in FIG. 3, the splines 13 on the end of the power take-off shaft will be holding the sleeve 23 in the open position at the same time that the member 52 is meshing with the member 23. The splines of the member 52 in the position shown in FIG. 3 are long enough to engage the splines and grooves 21 and 22 of the opening 18 and also engage the teeth on the sleeve 23. It is this combination that prevents the member 23 from moving from this locked open position as it would move because of the force of the spring 34 if this stub shaft member 52 was not present. The coupler 10 is then again in a position to receive the power take-off shaft 11 without the need to manually move the locking sleeve 23 to the unlocked or open position as would be necessary if the holding mechanism including the stub shaft member 52 was not present.

Figure 10:
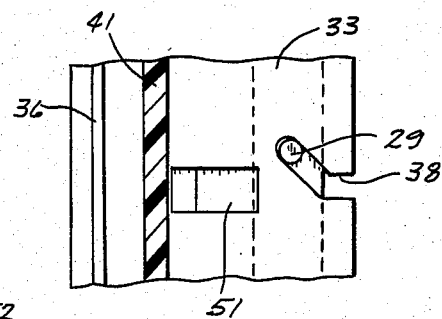
FIG. 10 is a view taken along line 10—10 of FIG. 9.
Figure 11:
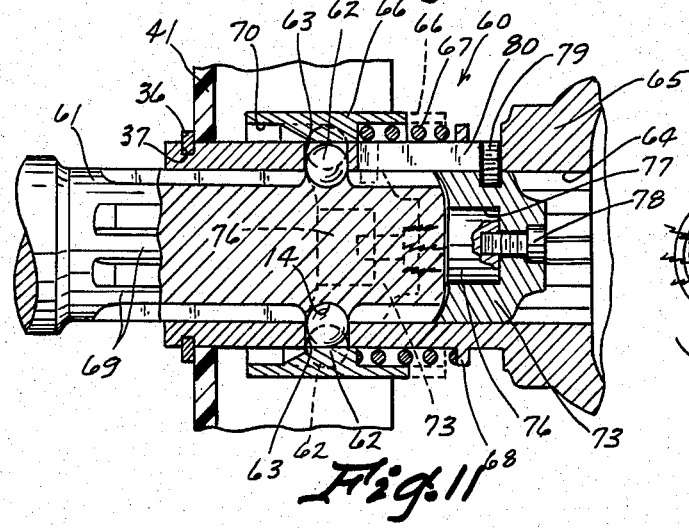
FIG. 11 is a cross-sectional view of an alternate form of the invention.
Figure 12:
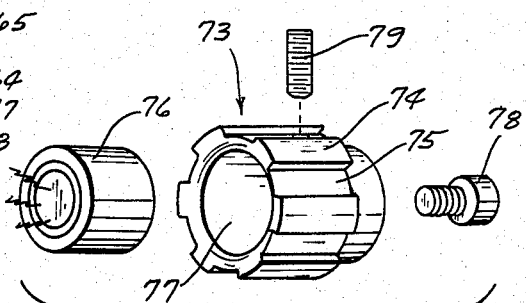
FIG. 12 is an exploded perspective view of the movable stub shaft of the FIG. 11 embodiment.

Referring now to the embodiment shown in FIGS. 11 and 12, a coupling device 60 is shown in a coupling arrangement with a power take-off shaft 61. It is noted that the power take-off shaft 61 is a standard six spline power take-off shaft as contrasted with the standard 21 spline power take-off shaft 11 shown in FIG. 1. This coupling device 60 is generally of the type shown in U.S. Pat. No. 3,260,541, which is incorporated herein by reference. A plurality of metal balls 62 are disposed in openings 63, which openings 63 are not quite big enough on the inside thereof to allow the balls 62 to pass therethrough, but they are large enough to allow the ball 62 to protrude therethrough and into an opening 64 in the housing 65 of the coupler 60. A reciprocating collar member 66 is disposed around the housing 65 and is biased to the position shown in FIG. 10 by a spring 67 which is in abutment with an upstanding portion 68 of the housing 65. In the position shown in FIG. 11, the balls 62 are cammed into an annular recess 14 (such as the one shown in FIG. 1) of the power take-off shaft 61 and lock against teeth 69 of the power take-off shaft 61 to prevent movement of the power take-off shaft 61 with respect to the housing 65. When it is desired to unlock this type of coupling device, the free spinning guard 41 is manually moved to the right as far as possible, which also causes the collar 66 to be moved to the right against the force of the spring 67 as viewed in FIG. 11. Once this occurs, the balls 62 are free to move up into the annular space 70 in the collar 66 when the coupler 60 is pulled further to the right as is shown in FIG. 11, the teeth 69 of the power take off shaft 61 creating the force which causes the balls 62 to move up into the space 70 and thereby allowing the power take-off shaft to come out of the opening 64 in the housing 65. What has been described so far above with respect to the embodiment of FIGS. 11 and 12 is more or less a standard coupling.

Referring now to the improvement of this invention shown in FIGS. 11 and 12, it is noted that a stub shaft 73 is disposed within the opening 64 and has splines and grooves 74 and 75 respectively around the periphery thereof which mesh with the complementarily shaped opening 64. A magnet 76 is affixed into an opening 77 in the stub shaft member 73 by means of a bolt 78 which is threadedly received into the magnet 76 and through the member 73. A set screw 79 is also threadedly received into the stub shaft member 73 and this set screw member 79 extends upwardly and is received into a slot 80 in the housing 65. The purpose of this set screw 79 is to limit the movement of the stub shaft member 73 from the position shown in solid lines in FIG. 11 wherein the member 79 is in abutment with the one end of the slot 80 to the position shown to the left in dashed lines in FIG. 11 whereby the set screw 79 is in abutment with the other end of the slot 80.

When the power take-off shaft 61 is removed from the opening 64 of the housing 65 in the manner described above, the stub shaft member 73 follows the power take-off shaft 61 because of the magnetic attraction between the magnet 76 and the end of the power take-off shaft 61. Consequently, when the power take-off shaft 61 is removed from the coupling 60, or alternatively when the housing coupling 60 is removed from the power take-off shaft, the stub shaft member 73 is automatically moved to the leftmost position shown in dashed lines in FIG. 11 whereby the balls 62 are held outwardly by the stub shaft member 73 and are thereby held in the opened or unlocked position. Consequently, the next time it is desired to couple the coupling 62 to a power take-off shaft 61, the power take-off shaft 61 is inserted into the left side of the opening 64 as shown in FIG. 10 and as the power take-off shaft 61 is inserted therein, it will push the stub shaft member 73 out of the way. At the same time the balls 62 will be held outwardly until such time as they are in alignment with the groove 14 of the power take-off shaft 61, at which time the spring 67 will cam the balls 62 into the locking position shown in solid lines in FIG. 11.

It will be appreciated from the two embodiments shown that the scope of this invention is indeed very broad. For example, the magnetic stub shaft of FIGS. 11 and 12 could be used instead of the spring stub shaft in the coupling shown in FIGS. 1–10, and vice versa. Additionally, there are numerous other types of couplers, such as that shown in U.S. Pat. No. 2,448,278 to Ronning, which could utilize a stub shaft follower to hold the coupler in an open or unlocked position in readiness for reception of a shaft and still have the capability of automatically locking the coupler to the shaft when such shaft is in the proper position with respect to the coupler. The utilization of such a stub shaft follower, for example members 52 and 73 as described above, causes an automatic locking coupler to lock open and thereby allow a power take-off shaft to be inserted therein without the need to manually move the coupler to an unlocked position.

Obviously many modifications and variations of the present invention are possible in light of the above teachings. It is therefore to be understood that, within the scope of the appended claims, the invention may be practiced otherwise than as specifically described.

I claim:

1. In a coupling for releasably connecting a power shaft to a drive shaft having external splines and an annular recess around the shaft between the opposite ends of the splines, the coupling including a housing connected to the power shaft and having an open end with a bore having internal splines meshable with the external splines on the drive shaft, an annular locking sleeve having internal splines alignable with the internal splines of the housing and rotatably mounted in the housing for shifting between open and locking positions wherein the splines are respectively aligned and misaligned with the internal splines of the housing, the housing being axially slidable onto the drive shaft when the locking sleeve is in its open position with the external splines on the drive shaft meshing with the internal splines in the housing and the locking sleeve to a drive position wherein the locking sleeve splines are located in the recess of the drive shaft so that the sleeve is rotatable to its locking position wherein the misalignment of the splines of the locking sleeve with the splines of the drive shaft prevent separation of the housing and the drive shaft, and further including a follower member having external splines meshing with the internal splines of the housing and axially slidable therein between a first position wherein it engages only the housing spline and a second position wherein it engages both the housing spline and the locking sleeve splines to hold said splines in alignment and spring means for biasing the following member toward its second position, characterized in that the spring means comprises a compression spring means mounted in the housing bore and having one end connected to the housing and the other end attached directly to the follower member.

2. A torque transmitting coupling comprising:
a housing;
an opening in said housing, a portion of said opening being non-circular, said opening being adapted to receive a non-circular, portion of a shaft;
means for selectively locking said non-circular portion of said shaft into the opening in said housing, said locking means being biased to a lock position and selectively movable to an unlocked position;
means operable in response to the removal of said shaft from said opening for holding said locking means in said unlocked position whereby said shaft can be re-inserted into said opening, said holding means comprising a member disposed within said opening and movable within said opening from a first position holding said locking means in said unlocked position to a second position allowing said locking means to move to said locked position;
guard means rotatably disposed around said housing; and
rotation means attached to said guard means for selectively permitting said guard means to be fixed with respect to said housing whereby rotation of said guard causes like rotation of said housing, said rotation means comprising a collar operably disposed around said housing between said housing and said guard means; slot means disposed in said oollar; pin means extending through an opening and said guard means; means for biasing said pin means outwardly; said pin means being engageable with said slot means for effecting rotation of said housing by rotating said guard means; and, one end of said slot means having a tapered configuration to facilitate the unrestricted movement of said pin means into and out of said slot.

3. A torque transmitting coupling comprising:
a housing;
an opening in said housing, a portion of said opening being non-circular, said opening being adapted to receive a non-circular portion of a shaft;
means for selectively locking the non-circular portion of said shaft into said opening in said hosuing, said locking means being biased to a locked position and selectively movable to an unlocked position;
means operable in response to the removal of said shaft from said opening for holding said locking means in said unlocked position whereby said shaft can be re-inserted into said opening; said holding means comprising a member disposed within said opening and moveable within said opening from a first position holding said locking means in said unlocked position to a second position allowing said locking means to move to said locked position; and
magnetic means formed in said member for causing said member to be attracted to said shaft whereby said member is pulled by said shaft and said magnetic means from said second to said first position thereof as said shaft is removed from said opening, said member also being pushed from said first to said second position thereof when said shaft is inserted into said opening whereby said locking means is allowed to move to said locked position thereof.

4. A torque transmitting coupling comprising:
a housing;
an opening in said housing, a portion of said opening being non-circular, said opening being adapted to receive a non-circular portion of a shaft;
means for selectively locking the non-circular portion of said shaft into the opening in said housing, said locking means being biased to a locked position and selectively movable to an unlocked position;
means operable in response to the removal of said shaft from said opening for holding said locking means in said unlocked position whereby said shaft can be re-inserted into said opening; said holding means comprising a member disposed within said opening and movable within said opening from a first position holding said locking means in said unlocked position to a second position allowing said locking means to move to said locked position;
guard means rotatably disposed around said housing; and
rotation means attached to said guard means for selectively permitting said guard means to be fixed with respect to said housing whereby rotation of said guard causes like rotation of said housing, said rotation means comprising an opening in said guard means, button means disposed in said opening, a leaf spring means attached at each end to said button means and formed in a circular configuration within said guard means for biasing said button means radially outwardly and said rotation means to a non-fixed position with respect to said housing for allowing said guard to freely rotate around said housing, whereby pushing on said button means in a radially inwardly direction causes said rotation means to fix said guard means with respect to said housing whereby rotation of said guard means effects rotation of said housing.

5. A torque transmitting coupling comprising:
a housing;

an opening in said housing, a portion of said opening being non-circular, said opening being adapted to receive a non-circular portion of a shaft;

means for selectively locking said non-circular portion of said shaft into said opening in said housing, said locking means being biased to a locked position and selectively movable to an unlocked position; and means operable in response to the removal of said shaft from said opening for holding said locking means in said unlocked position whereby said shaft can be re-inserted into said opening, said holding means comprising a member disposed within said opening and movable within said opening from a first position holding said locking means in said unlocked position to a second position allowing said locking means to move to said locked position, said holding means comprising means for biasing said member to said first position, said member being pushed to said second position by said shaft when said shaft is inserted into said opening and following said shaft to move from said second to said first position thereof when said shaft is removed from said opening whereby said holding means holds said locking means in said unlocked position when said shaft is removed from said opening and allows said locking means to move to said locked position when said shaft is disposed within said opening, said non-circular portion of said opening in said housing including a plurality of parallel splines and grooves aligned with the longitudinal axis of said opening and disposed around the periphery thereof and wherein said member includes at least one continuous spline means of a size which can be slideably received within at least one of said grooves in said opening, said spline means engaging said locking means and holding said locking means in said unlocked position in said first position of said member, said member including means operably connected to said housing for maintaining alignment of said spline means with said at least one groove, said locking means including a sleeve rotatably disposed within said housing, said sleeve having splines and grooves around the inner periphery thereof of a configuration like said splines and grooves disposed around the inner periphery of said housing opening.

* * * * *